(12) United States Patent
Breitweg (10) Patent No.: US 12,264,942 B2
(45) Date of Patent: Apr. 1, 2025

(54) SENSOR UNIT WITH FASTENING ELEMENT FOR FASTENING TO A STRUCTURE

(71) Applicant: Thales Management & Services Deutschland Gmbh, Ditzingen (DE)

(72) Inventor: Rolf Breitweg, Stuttgart (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 232 days.

(21) Appl. No.: 17/806,012

(22) Filed: Jun. 8, 2022

(65) Prior Publication Data

US 2022/0299345 A1  Sep. 22, 2022

Related U.S. Application Data

(63) Continuation of application No. PCT/EP2020/085779, filed on Dec. 11, 2020.

(30) Foreign Application Priority Data

Dec. 12, 2019 (EP) .................................... 19215774
Jan. 17, 2020 (EP) .................................... 20152514

(51) Int. Cl.
*G01D 11/30* (2006.01)
*B29C 65/14* (2006.01)
(Continued)

(52) U.S. Cl.
CPC .......... *G01D 11/30* (2013.01); *B29C 65/1406* (2013.01); *B61K 9/08* (2013.01);
(Continued)

(58) Field of Classification Search
None
See application file for complete search history.

(56) References Cited

U.S. PATENT DOCUMENTS 9,434,379 B2  9/2016  Naegele
10,444,095 B2  10/2019  Glueck et al.
(Continued)

FOREIGN PATENT DOCUMENTS

DE  20 2013 001660 U1  6/2013
DE  10 2017 216811 A1  3/2019
(Continued)

OTHER PUBLICATIONS

"Elastisches Kleben-Reduzierung Der Systemkosten In Der Solarindustrie", Sonnenenergie, Nov.-Dec. 2011, pp. 50-51.
(Continued)

*Primary Examiner* — Patrick Assouad
*Assistant Examiner* — Mark A Shabman
(74) *Attorney, Agent, or Firm* — Orbit IP, LLP; Marc G. Martino (57) ABSTRACT

A fastening element for a sensor is disclosed, which fastening element can be fastened to a structure by means of a light-curing adhesive. The light-curing adhesive is cured within the cavities provided for receiving the light-curing adhesive by direct and/or indirect illumination. Furthermore, a sensor unit having a sensor and a fastening element, an arrangement having a sensor unit and a structure, and a method for providing an arrangement is disclosed.

15 Claims, 5 Drawing Sheets

(51) Int. Cl.
  *B61K 9/08*     (2006.01)
  *G01B 11/16*    (2006.01)
  *G01D 21/02*    (2006.01)
  *G01L 1/24*     (2006.01)

(52) U.S. Cl.
  CPC .............. *G01D 21/02* (2013.01); *G01B 11/16* (2013.01); *G01L 1/242* (2013.01)

(56) References Cited

U.S. PATENT DOCUMENTS

| | | | |
|---|---|---|---|
| 2010/0175484 A1 | 7/2010 | Saigh | |
| 2014/0226291 A1 | 8/2014 | Gibbs et al. | |
| 2015/0291274 A1* | 10/2015 | Mason | B64C 3/20 403/270 |
| 2016/0356661 A1* | 12/2016 | Glueck | G01M 11/085 |
| 2018/0154583 A1* | 6/2018 | Evans | F16B 11/006 |
| 2019/0041246 A1 | 2/2019 | Togashi et al. | |
| 2020/0231194 A1 | 7/2020 | Schicker et al. | |

FOREIGN PATENT DOCUMENTS

| | | |
|---|---|---|
| DE | 10 2018 211 503 A1 | 1/2020 |
| EP | 2 247 971 B1 | 10/2011 |
| EP | 3 428 596 A1 | 1/2019 |
| EP | 3 751 248 A1 | 12/2020 |
| JP | S61-1105 U | 1/1986 |
| JP | 2002-328010 A | 11/2002 |
| JP | 2010-525337 A | 7/2010 |
| JP | 2017-504030 A | 2/2017 |
| JP | 6270195 B1 | 1/2018 |
| KR | 10-2013-0001185 A | 1/2013 |
| WO | 2009/106576 A1 | 9/2009 |
| WO | 2019/057491 A1 | 3/2019 |

OTHER PUBLICATIONS

"Ereneuerbare Energien", Dichten/Kleben/Vergießen-Photovoltaik-Module, Otto Chemie, Retrieved online via: https://www.otto-chemie.de/de/erneuerbare energien, 6 pages.

"OLEDS aus dem Drucker", c't Magazin für Computertechnik, 2019, Issue 16, p. 42.

Röhm, "Dunn, Dünner, Lichtleitfolie", Plexiglas® Folien, 14 pages.

* cited by examiner

SENSOR UNIT WITH FASTENING ELEMENT FOR FASTENING TO A STRUCTURE

CROSS-REFERENCE TO RELATED APPLICATIONS

This continuation application claims priority to PCT/EP2020/085779 filed on Dec. 11, 2020 which has published as WO 2021/116417 A1 and also the European application number 19215774.1 filed on Dec. 12, 2019 and European application number 20152514.4 filed on Jan. 17, 2020, the entire contents of which are fully incorporated herein with these references.

DESCRIPTION

Field of the Invention

The invention relates to a fastening element for fastening a sensor to a structure to be monitored, in particular a rail, to a sensor unit having such a fastening element, to a sensor arrangement for fastening the sensor unit to a structure to be monitored, and to a method for arranging the sensor unit.

Background of the Invention

Fastening elements, which are fastened by means of adhesive substances, are already known from the prior art and are used to attach components, in particular sensors, to structures. A typical field of application for this are rail monitoring elements. The components of the rail monitoring element, in particular sensors for measuring forces acting on the rail, can be fastened to the rail without weakening the structure, for example by drill holes.

Fastening elements for fastening photovoltaic modules to structures using elastic adhesives have become known from citations [1] and [2]. Although elastic adhesives have a high resistance to weathering and aging, they also compensate for expansion and movement of the structure and are therefore not suitable for fastening sensors which are intended to measure forces acting on the structure.

For this reason, fastening elements of rail monitoring elements having a sensor are fastened by means of adhesives, which have the highest possible rigidity after curing. In particular, when attaching fastening elements to rails, thermal adhesion methods are predominantly used.

Citation [4] discloses a method for installing a rail monitoring element using a heat-activatable film. The connection is produced by inductively heating the rail. However, this requires a considerable energy input in the form of heat, which, in addition to the high energy costs, requires equipment that makes it possible to provide the required energy even in remote and difficult-to-access track sections. The heavy and bulky equipment required for inductive heating has to be transported to the place of use by the trained specialists, which ultimately entails a great deal of logistical effort.

Citation [3] from the applicant discloses a rail monitoring element which is attached to a rail by means of a thermally activatable adhesive. The rail monitoring element is pressed against the rail and the adhesive is heated by a hot wire located in the adhesive layer in order to create the adhesive connection. Using this method, however, the heat input for curing the adhesive only takes place at points.

SUMMARY OF THE INVENTION

Object of the Invention

The object of the invention is that of providing a fastening element and a sensor unit having such a fastening element which is inexpensive to produce and, moreover, can be attached to a structure to be monitored inexpensively and with little effort.

DESCRIPTION OF THE INVENTION

This object is achieved according to the invention by a fastening element, a sensor unit, a sensor arrangement and a method according to the claims.

The fastening element according to the invention has a base support element, a sealing frame for sealing the base support element with respect the structure, a cavity for receiving a light-curing adhesive, the cavity being delimited on one side by the base support element and peripherally by the sealing frame, and at least one light-emitting for coupling light beams into the cavity. In addition, the fastening element can also have other elements, in particular a protective cover.

The base support element is used to receive a component, in particular a sensor, and is particularly advantageously designed in the form of a rectangular plate. There may be other shapes due to the sensor to be fastened as well as the surface of the structure to which the fastening element is intended to be fastened. In particular, round and/or polygonal shapes are conceivable. The base support element is designed to be arranged on a structure to be monitored. In general, arranging the fastening element on all surfaces is conceivable. In the following, the arrangement of the fastening element in the field of application of rail monitoring elements is discussed, in particular by way of example, with the structures to be monitored representing in particular rails and train axles. The list is not to be understood as exhaustive.

When arranged on a rail, the fastening element is preferably arranged in the vertical section of the rail profile (rail neck). In the preferred installation position, the base support element is therefore positioned parallel to the rail. The base support element is spaced apart from the rail in at least one sub-section. In other words, a space is created between the base support element and the rail.

The sealing frame is detachably or non-detachably arranged on the base support element, which frame keeps the base support element at a distance with respect to the structure. The sealing frame seals the space between the base support element and the rail, in particular over the entire periphery, and forms a cavity together with the base support element. For this purpose, the sealing frame can be designed to be flexible, in particular as an elastomer, particularly preferably as silicone, and/or to be rigid. The sealing frame can be formed in one piece with the base support element. A flexible configuration is particularly advantageous with regard to the sealing frame resting against the surface of the structure in the fastening region with as few gaps as possible. This improves the sealing effect of the sealing frame.

The cavity is formed between the base support element and the structure and is delimited by the sealing frame in the peripheral direction. In other words, the cavity is predominantly, in particular completely, closed on the side facing the base support element and predominantly, in particular completely, open on the side facing the structure.

The cavity is designed to receive a light-curing adhesive. A light-curing adhesive is understood to mean an adhesive bonding agent which cures under the action of light, in particular ultraviolet light (UV light).

The fastening element has a light-emitting surface for coupling light into the cavity. The light-emitting surface forms a boundary surface with the cavity. In other words, the fastening element has through which light is radiated into the cavity. Examples of a light-emitting surface include a translucent light-emitting diode housing, in particular an LED lens, the surface of a transparent layer directed to the cavity, in which the light means is accommodated, or the surface of a light-conducting film or a light-conducting plate, the list being non-exhaustive. The incident light can be emitted directly at the light-emitting surface and/or guided to the light-emitting surface via light-conducting structures (light-conducting film/light-conducting plate). By introducing light into the cavity when the fastening element is arranged on the structure, curing of the light-curing adhesive and thus fastening of the fastening element to the structure is made possible.

An embodiment is preferred in which the fastening element has at least one passage recess for introducing the light-curing adhesive into the cavity. The at least one passage recess can be formed in the base support element and/or in the sealing frame and connects the cavity with the environment of the fastening element. The passage recess can be designed in particular in the form of a gap in the sealing frame. The passage recess particularly advantageously has a clear width of from 1-30 millimeters, in particular from 2-20 millimeters, particularly preferably from 5-10 millimeters. As a result, the adhesive can be poured into the cavity in a particularly simple manner by means of a pouring apparatus, in particular a cartridge pistol.

A development in which the fastening element has at least one further passage recess and/or a filling control means is particularly preferred. A further passage recess allows the air to escape from the cavity particularly easily when the sealing frame is in particularly close contact with the structure during the filling process with adhesive. In addition, a further recess makes it possible to draw conclusions about the degree to which the cavity is filled, since after the cavity has been predominantly, in particular completely, filled, superfluous adhesive can swell out of the further passage recess. A filling control means can alternatively or additionally be designed in the form of a partially transparent region, in particular a clearly transparent viewing window, in the base support element and/or in the sealing frame and at least allow conclusions to be drawn about the degree to which the cavity is filled.

An embodiment in which the fastening element has at least one light source, in particular a light-emitting diode, for directly or indirectly at least partially, in particular completely, illuminating the cavity is also preferred. The light source is aligned with respect to the light-emitting surface in such a way that the light is emitted predominantly, in particular completely, into the cavity. In other words, the luminous effect of the light source is directed directly and/or indirectly into the cavity, in particular via a light-conducting film or a light-conducting plate. In this case, the light emission is directed in particular from the base support element toward the side of the cavity that is opposite the base support element.

In a further preferred embodiment, the fastening element has a large number of light sources which are arranged at a distance from one another, in particular equidistantly. This allows particularly even and complete illumination of the cavity.

An embodiment in which the light sources are arranged within the cavity of the fastening element is preferred. The light sources can themselves have the light-emitting surface. In this embodiment, the cavity is directly illuminated by the light sources. The arrangement of the light sources in one plane, directed toward the cavity, in particular on the base support element, is particularly advantageous. The even arrangement of the light sources within the cavity makes particularly even illumination possible. The light-emitting surface is arranged between the cavity and the light source and protects the light source from direct contact with the light-curing adhesive. The light-emitting surface can in particular be light-scattering, particularly preferably diffusely scattering, in order to allow the largest possible illumination region of the light source. As a result, the light-curing adhesive is cured particularly evenly and completely. After the adhesive has cured, the light sources remain as so-called "lost elements" within the cavity.

An embodiment of the fastening element in which the base support element comprises a transparent layer in which the light source is arranged is also preferred. The light source is aligned in the transparent layer in such a way as to transmit light directly into the cavity. Together with the light source, the transparent layer forms a "luminescent layer" so that the cavity is delimited by a flat surface. This makes it easier to fill the cavity.

A development of the fastening element is preferred, in which development the light source is designed to emit UV light. This promotes particularly rapid curing when using UV light-curing adhesive.

An embodiment in which the fastening element has at least one light-conducting element for connecting the light source to the light-emitting surface in a light-conducting manner is particularly preferred. As a result, the light source can be arranged at a spatial distance from the cavity. In other words, the light source can be arranged outside the cavity on the fastening element. The light source emits light into a light-conducting element, in particular into a light-conducting film, the light-conducting element having at least one light exit region which is directed into the cavity. In other words, the cavity is indirectly illuminated. The light-conducting element, in particular the light-conducting film, has the light-emitting surface in the light exit region, which allows even decoupling of light. This promotes the light distribution in the cavity.

In a particularly preferred development of the fastening element, the light source is arranged in the peripheral direction of the sealing frame on and/or in the sealing frame. The sealing frame can be at least partially, in particular completely, transparent. The sealing frame can also have the light-emitting surface. Alternatively, the light can be coupled through the transparent frame into a light-conducting element adjoining the frame. As a result, the base support element can remain unchanged, which has a particularly favorable effect on existing manufacturing processes.

Alternatively or additionally, the sealing frame can have passage recesses which are designed for arranging the light source. In a particularly advantageous embodiment, the light source is arranged in and/or on at least one passage recess which is designed for filling the cavity, after the cavity has been filled.

In a preferred embodiment of the fastening element, the sealing frame has an adhesive agent, in particular a resin or an adhesive tape, on the side thereof facing the structure.

This makes it possible to temporarily attach the fastening element to the structure and simplifies pouring of the adhesive as well as the curing process.

A development of the fastening element in which the light source is detachably and/or loosely arranged on the base support element and/or on the sealing frame is particularly preferred. Here, the light source can be arranged particularly advantageously on the fastening element for the duration of curing the adhesive and then removed. As a result, no "lost elements" remain on or in the fastening element and the light source can particularly advantageously be reused.

Alternatively or additionally, the light source can be positioned next to the fastening element and only, in particular for a limited time, be connected to the fastening element, in particular the cavity, via the at least one light-conducting element. A first light-conducting element can be arranged on the light source and a second light-conducting element can be arranged on the fastening element, the first light-conducting element being arranged on the second light-conducting element for the duration of illuminating the cavity.

An embodiment in which a protective cover is arranged on the fastening element, in particular on the base support element and/or on the sealing frame is preferred. The protective cover can be detachably and/or non-detachably arranged on the fastening element. In particular, a latching apparatus and/or a screwing apparatus can be provided for arranging the protective cover on the fastening element. A protective cover can effectively protect the fastening element and components arranged thereon from unauthorized access and weather and/or environmental influences.

The sensor unit according to the invention has a fastening element and a sensor. The sensor can be detachably or non-detachably arranged on the fastening element. The sensor is arranged on the side of the base support element facing away from the cavity. This particularly advantageously allows the sensor to be arranged on the fastening element after the fastening element has been arranged on the structure. In general, however, it is also conceivable that the sensor is already arranged on the base support element when the fastening element is arranged on the structure.

The fastening element is designed to arrange a wide variety of sensors. A sensor is understood to mean any type of measuring probe and/or detector for detecting a physical or chemical property. For example, but not exhaustively, mention should be made of temperature sensors, strain gages, humidity, pressure or ionic strength.

In a preferred development of the sensor unit, the sensor is a strain sensor, preferably a rail monitoring element having an optical fiber comprising fiber Bragg grating.

The sensor arrangement according to the invention has a sensor unit and a structure to be monitored. The sensor unit is arranged on the structure in such a way that a light-cured adhesive introduced into the cavity forms a connection between the base support element and the structure. In other words, the cavity of the fastening element is predominantly, in particular completely, filled with light-curing adhesive when the sensor unit is arranged on the structure.

The method according to the invention for fastening a sensor unit to the structure comprises the following method steps:
a) applying the sensor unit to the structure;
b) introducing the light-curing adhesive into the cavity of the sensor unit;
c) introducing light into the cavity for the purpose of curing the adhesive.

The specified sequence is particularly advantageous with regard to optimal dosing of the adhesive and filling of the cavity, since under-dosing is effectively prevented and at the same time the adhesive can be prevented from spilling out in the event of over-dosing.

However, the steps of the method are not limited to the sequence stated. It is also conceivable, for example, to introduce light-curing adhesive into the cavity before the sensor unit is applied to the structure.

A development of the method according to the invention in which, in particular between method step b) and method step c), the light source is arranged on the fastening element is preferred.

A development of the method according to the invention in which, in particular between method step b) and method step c), the light source is positioned next to the fastening element on the light-conducting element is preferred.

A development of the method according to the invention in which, in particular after method step c), the light source is removed from the fastening element is preferred.

A development of the method according to the invention in which, in particular after method step c), a protective cover is arranged on the fastening element is preferred.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but rather have exemplary character for the description of the invention.

DETAILED DESCRIPTION OF THE PREFERRED EMBODIMENTS

Figure 1:
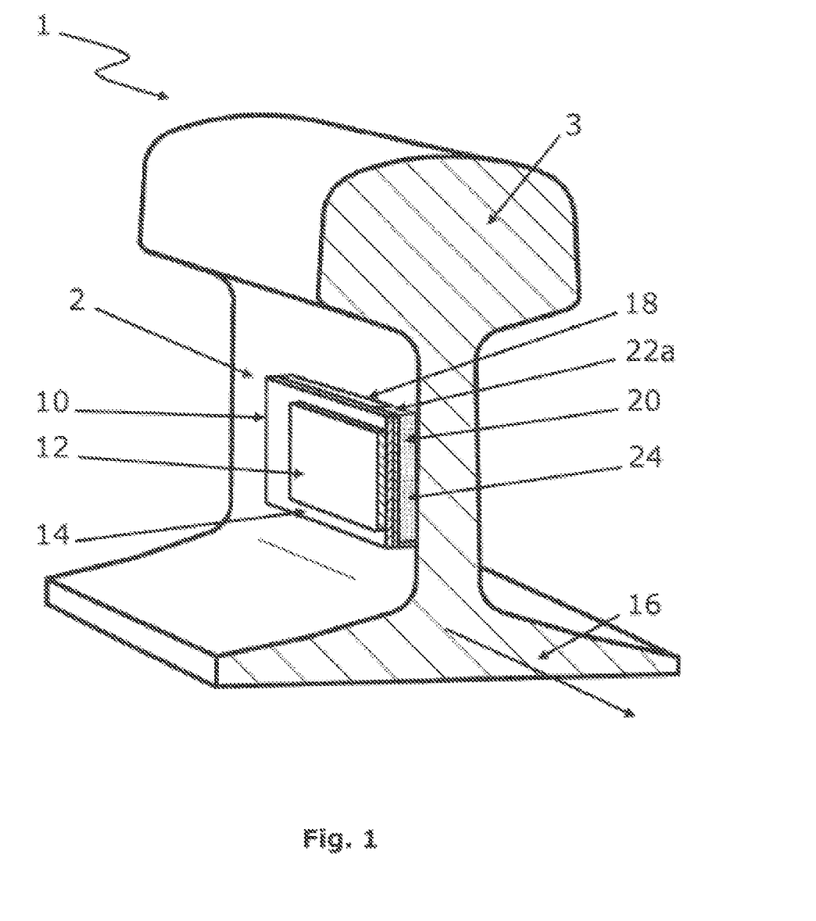
FIG. 1 shows a sensor arrangement having a first embodiment of a sensor unit and a structure to be monitored in a sectional view.

FIG. 1 shows a sensor arrangement 1 having a sensor unit 2 which is arranged on a rail as a structure to be monitored 3. The sensor unit 2 has a fastening element 10 and a sensor 12 which is mounted on the fastening element 10. The structure 3 has a vertical section (rail neck) to which the sensor unit 2 is attached. The attachment of the sensor unit 2 does not make any high demands on the underlying structure and is flexible with regard to the arrangement region. The fastening element 10 can, for example, be attached to the structure 3 in such a way that the contact surface of the fastening element 10 on the structure 3 is arranged parallel or at an inclined angle to the direction of the effect of gravity. In other words, in the installation position on the side of the structure 3, the mounting surface is aligned substantially vertically. However, other installation positions are also possible.

The fastening element 10 has a plate-like base support element 14 and is arranged parallel to the direction of extension 16 of the structure 3 on the vertical rail section. A sealing frame 18 is arranged on the base support element 14 and abuts the structure 3 predominantly, in particular completely, form-fittingly. The sealing frame 18, the base support element 14 and the structure 3 delimit a cavity 20. The sensor 12 is attached to the base support element 14 at the point opposite the cavity.

The sealing frame 18 has a frame passage recess 22a which is designed for filling the cavity 20 with light-curing adhesive 24. The frame passage recess 22a is preferably also filled with adhesive 24 after the cavity 20 has been completely filled. This allows conclusions to be drawn as to the degree to which the cavity 20 is filled.

In FIG. 1, the cavity 20 is already completely filled with light-cured adhesive 24 which is the bonding agent between the fastening element 14 and the structure 3.

Figure 2:
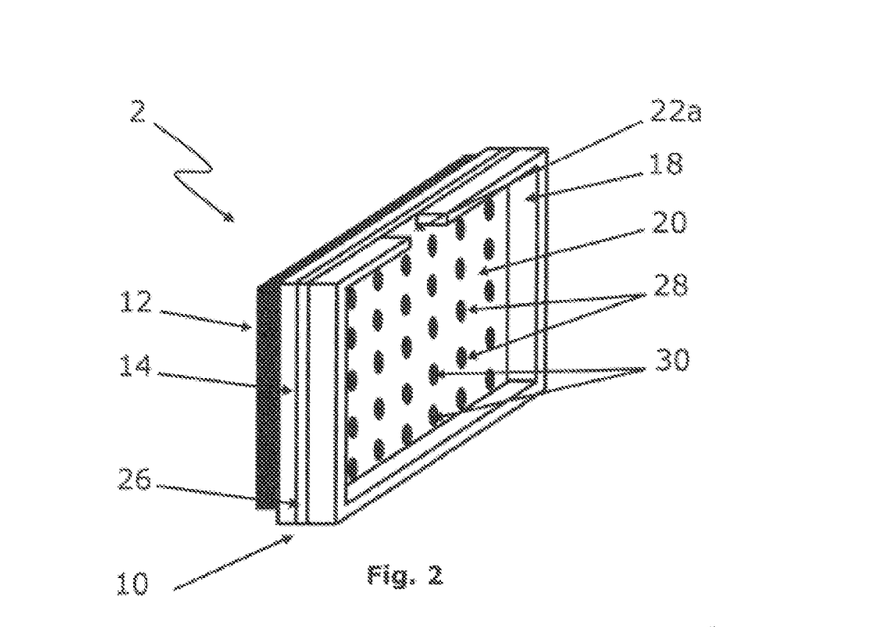
FIG. 2 shows the first embodiment of a sensor unit from FIG. 1 in a perspective view, the fastening element having a single cavity.

FIG. 2 shows the first embodiment of the sensor unit 2 from FIG. 1 in a perspective view looking at the assembly side of the fastening element 10. The sealing frame 18 has the frame passage recess 22a on the upper periphery of the sealing frame 18. The terms "above" and "below" refer to an installation position in the direction of the effect of gravity on a predominantly vertically extending contact surface. The arrangement of the frame passage recess 22a on the upper periphery of the sealing frame 18 shown in FIG. 2 particularly advantageously makes it possible for the adhesive 24 (not shown in FIG. 2) to be poured in using gravity. In general, it is conceivable for the frame passage recess 22a to be formed at any point on the sealing frame 18.

In the embodiment shown, the base support element 14 has a multi-layer design and has a transparent layer 26 having a light-emitting surface 28. The light-emitting surface 28 is directed into the cavity 20.

The transparent layer 26 has some light sources which are arranged inside the transparent layer 30 (shown in black) and are distributed equidistantly over the connecting surface, formed on the base support element 14, in particular the transparent layer 26, to the cavity 20. The transparent layer 26 has a light-emitting surface 28 in the region of each light source 30, which light-emitting surfaces/light sources are formed in the cavity 20 for better uniform distribution of the light 36 (see FIG. 4c, 5c, 6c) (for reasons of clarity, only two light sources 30 and two light-emitting surfaces 28 are provided with reference signs).

In the embodiment shown, the cavity 20 has as large a cross section as possible on the side facing the base support element 14 as on the side facing the structure 3. As a result, when the fastening element 10 is arranged on the structure 3, the same holding force can be formed between the adhesive 24 and the structure 3 in as particularly favorable a manner as between the adhesive 24 and the base support element 14 and prevents too much adhesive 24 from being introduced into the cavity 20. In a particularly advantageous manner, the sizes of the boundary surfaces between the adhesive 24 and base support element 14 and between the adhesive 24 and structure 3 can be adapted to the surface finish of the base support element 14 and the structure 3 so that, for example, the boundary surface between the adhesive 24 and base support element 14 is larger or smaller than the boundary surface between the adhesive 24 and structure 3. As a result, the surface-related holding force can nevertheless be formed evenly over a different surface ratio.

Figure 3:
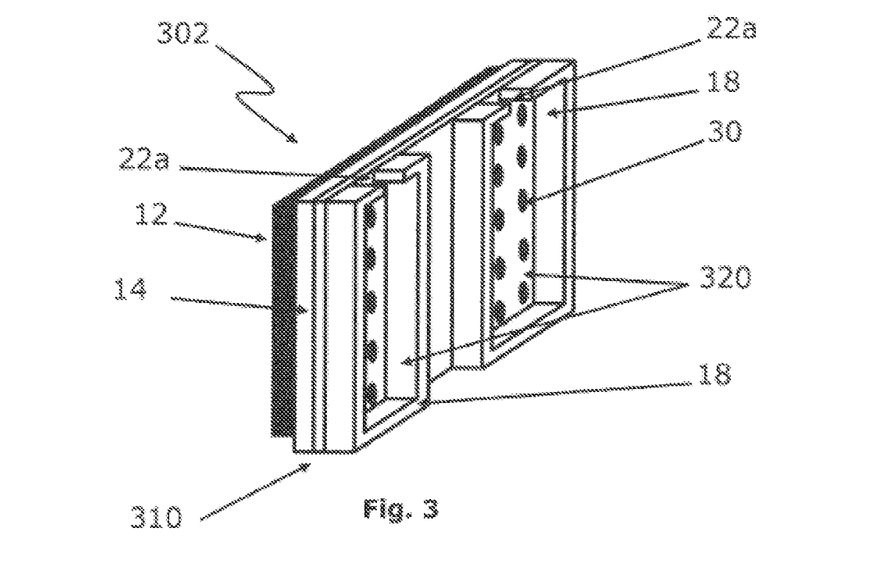
FIG. 3 shows a second embodiment of a sensor unit in a perspective view, the fastening element having two cavities.

FIG. 3 shows a second embodiment of a sensor unit 302. The base support element 14, together with two sealing frames 18, forms two cavities 320 which are spatially separated from one another. By forming a plurality of cavities 20 which, in the example shown in FIG. 3, do not cover the entire surface of the base support element 14, the number of light sources 30 and the amount of adhesive 24 required (not shown in FIG. 3) are reduced compared to the embodiment shown in FIG. 2, while the dimensions of a fastening element 310 are the same. Each of the two cavities 20 has two frame passage recesses 22a for pouring in the adhesive 24 (see FIG. 4c, 5c, 6c) (for reasons of clarity, only one light source 30 is provided with a reference sign). The cavities 20 can be arranged on the base support element 14 in a particularly favorable manner at points on the base support element 14 that are functionally relevant for the sensor 12. The arrangement of the cavities 20 when a strain sensor is arranged on the base support element 14 is mentioned as an example, but is not exhaustive. By arranging the cavities 20 and therefore reinforcing the fastening element 310 after the adhesive 24 has cured in the region of the strain measuring points of the strain sensor arranged on the base support element 14, the expansion of the structure (not shown) can be transmitted particularly precisely to the sensor 12.

FIG. 4a-d show a sensor arrangement 401 having a sensor unit 402 which comprises a fastening element 410 having integrated light sources 30 and is applied to the structure 3 according to a method step a). For temporarily attaching the sensor unit 402 to the structure 3, the sealing frame 18 has an adhesive agent 32, e.g., in the form of an adhesive strip, on the side thereof which is in contact with the structure 3. As a result, the subsequent method steps can be carried out in a particularly simple manner since the sensor unit 402 does not have to be permanently pressed against the structure 3. Alternatively or additionally, the sensor unit 402 can be manually or mechanically pressed on.

Figure 4A:
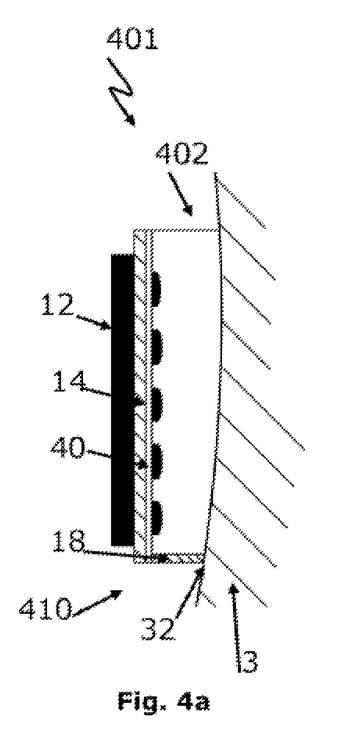
FIG. 4*a-d* show the various method steps of a method according to the invention for fastening a sensor arrangement having a sensor unit according to a third embodiment in a sectional view, the fastening element comprising a cavity and a passage recess on the frame side.
Figure 4B:
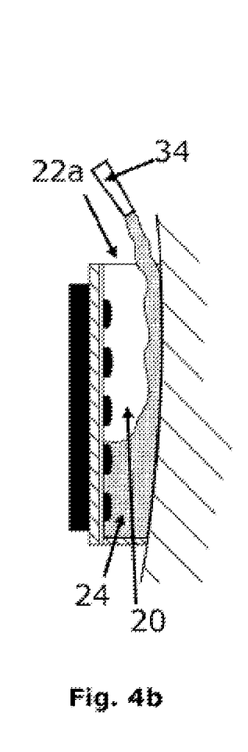

FIG. 4b shows the pouring of the adhesive 24 into the cavity 20 according to method step b) via the frame passage recess 22a formed on the upper side of the sealing frame 18. The adhesive 24 is provided by means of a cartridge 34. In general, the adhesive 24 can be provided in various ways; introduction by means of a cartridge 34 is particularly advantageous with regard to the dosage of the adhesive 24.

Figures 4C, 4D:
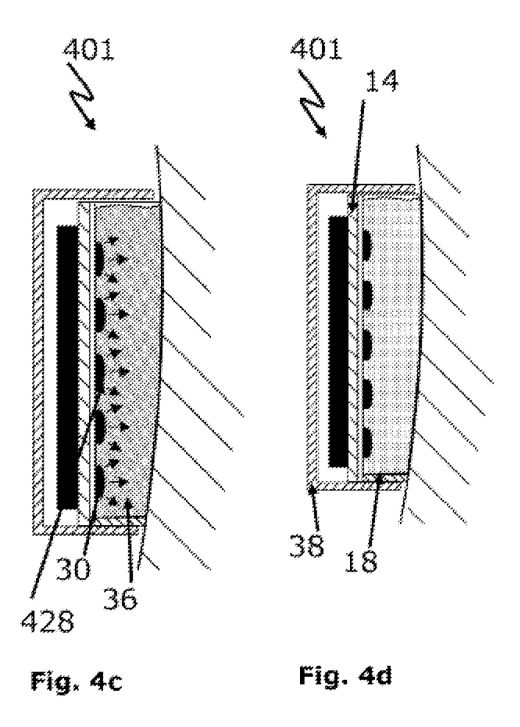

FIG. 4c shows the emission of light beams 36 into the cavity 20 according to a method step d) for curing the light-curing adhesive 24. For this purpose, the sensor unit 401 according to FIG. 4a-d has the light sources 30 which are arranged inside the cavity 20. Light-emitting surfaces 428 are arranged directly on the light sources 30, in particular in the form of a housing, particularly preferably in the form of an epoxy resin lens (for reasons of clarity, only one light source 30, one light-emitting surface 428 and one representative light beam 36 are provided with a reference sign). In order to supply the light sources 30 with energy, the sensor unit 402 has an integrated battery (not shown) which is connected to the light sources 30 via switchable electrical conductors 40 (for example in the form of a printed circuit board). After the adhesive 24 has been poured in, the light sources 30 are switched on. In this case, the battery (not shown) has an electrical capacity which provides the energy for the duration of illumination by the light sources 30 that is required for curing the adhesive 24. After the adhesive 24 has cured, the light sources 30 and the battery (not shown) remain on the sensor unit 402 as so-called "lost elements." Generally, an external power supply is also conceivable. It is also conceivable, if the sensor 12 itself includes a power supply, to supply the light sources 30 with energy via the power supply (not shown) which is provided for operating the sensor 12.

The sensor unit 402 has a protective cover 38 which is arranged on the fastening element 410, in particular the base support element 14 and the sealing frame 18. According to the embodiment from FIGS. 4c and 4d, the protective cover 38 is arranged on the sensor unit 402 by means of a press fit.

FIG. 4d shows the sensor arrangement 401 in its final state with the cured adhesive 24.

FIG. 5a-d show a method for fastening a sensor unit 502 according to a fourth embodiment on the structure 3, in order to obtain a sensor arrangement 501. The fastening element 510 has the completely surrounding sealing frame 18. A support passage recess 22b is formed in the base support element 514 and the printed circuit board 40.

Figure 5A:
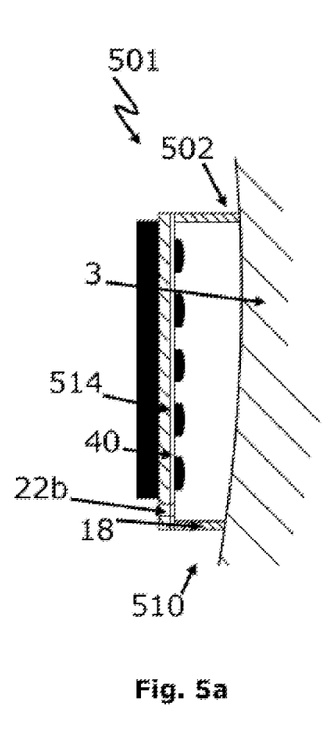
FIG. 5*a-d* show the various method steps of a method according to the invention for fastening a sensor unit according to a fourth embodiment in a sectional view, the fastening element comprising a cavity and a passage recess on the base support element side.
Figure 5B:
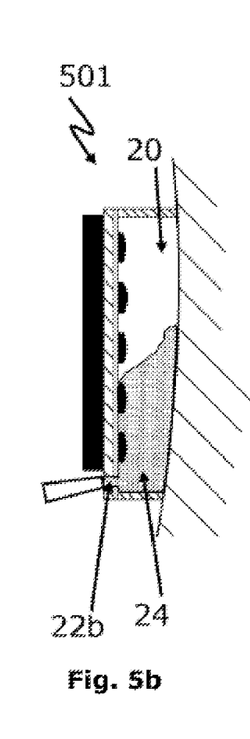

FIG. 5b shows the pouring of the light-curing adhesive 24 into the cavity 20 via the support passage recess 22b in the base support element 514, as a result of which the filling process can be carried out in a better way because a cartridge (light-tight) can be applied more easily.

Figure 5C:
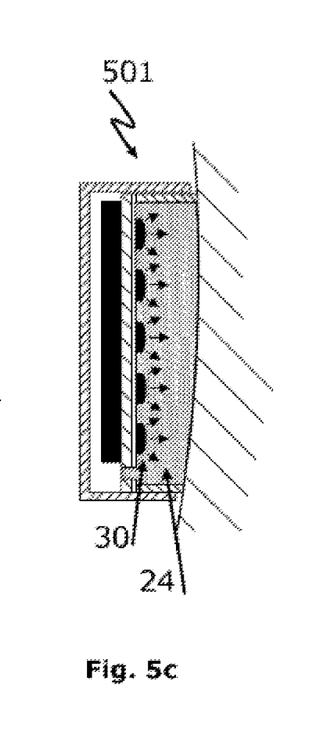

FIG. 5c shows the curing of the adhesive 24 by irradiation with light from the light sources 30.

Figure 5D:
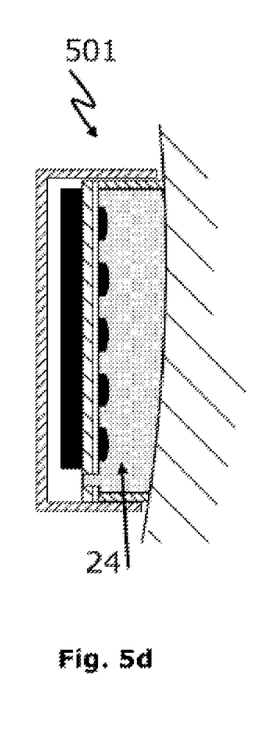

After the adhesive 24 has cured, the irradiation with light can be terminated (FIG. 5d)

FIG. 6a-d show a method for providing a sensor arrangement 601 by fastening a sensor unit 602 according to a fifth embodiment to the structure 3.

Figure 6A:
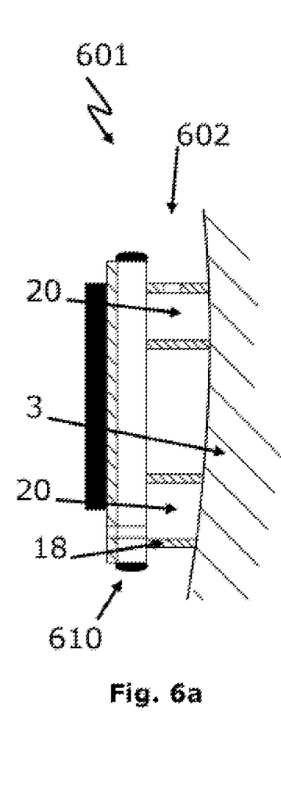
FIG. 6*a-d* show the various method steps of a method according to the invention for fastening a sensor unit according to a fifth embodiment in a sectional view, the fastening element comprising two cavities having a passage recess on the frame side and a passage recess on the base support element side.

A fastening element 610 has a light-conducting element 42 between a base support element 614 and two cavities 20. Light sources 30 are detachably arranged on the circumference of the light-conducting element 42. The light sources 30 emit light beams 36 into the light-conducting element 42. The light-conducting element 42 is designed to conduct the light beams 36 introduced by the light sources 30 through the light-conducting element 42 into the cavities 20 and to decouple said light beams into the cavities. For this purpose, the light-conducting element 42 has light-emitting surfaces 628 in the regions of the cavities 20. The introduced light beams 36 emerge again from the light-conducting element 42 via the light-emitting surfaces 628 (FIG. 6c). Correspondingly, the cavities 20 are indirectly illuminated by the light sources 30 by means of light being coupled in from the outside. The light is coupled into the light-conducting element 42 at at least one point, in particular at a plurality of points, particularly preferably over the entire periphery of the light-conducting element 42.

Figure 6B:
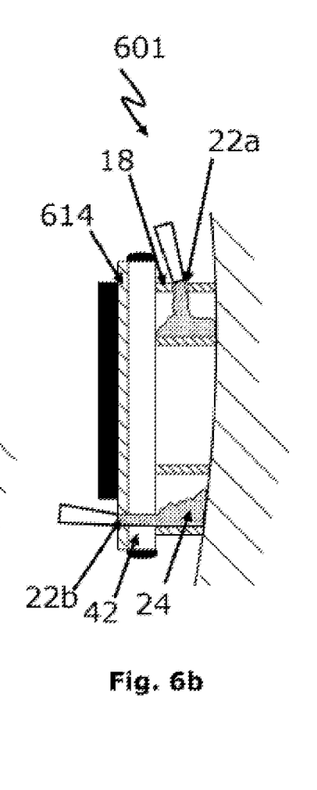
Figure 6C:
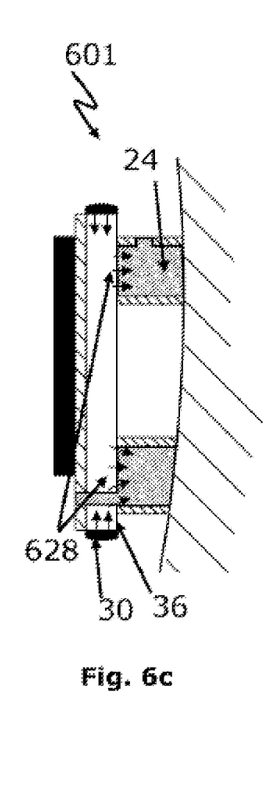

FIG. 6b shows the filling of the cavities 20 through a frame passage recess 22a and a support passage recess 22b. The frame passage recess 22a is formed in the sealing frame 18, and the support passage recess 22b is formed in the base support element 614 and the light-conducting element 42. A sealing frame 18 is formed peripherally and does not have a passage recess in the example shown. However, it is also possible to fill both cavities 20 through frame passage recesses 22a in the corresponding sealing frame 18 and/or through appropriately positioned support passage recesses 22b in the base support element 614.

FIG. 6c shows the curing process of the light-curing adhesive 24 after the cavities 20 have been filled. The light-conducting element 42 can have nanostructures and/or microstructures for decoupling the light beams 36 in the direction of the structure 3, in particular in the region of the light-emitting surface 628, in order to allow as homogeneous an illumination of the cavities 20 as possible. The light sources 30 are supplied with energy, for example by an external battery (not shown).

Figure 6D:
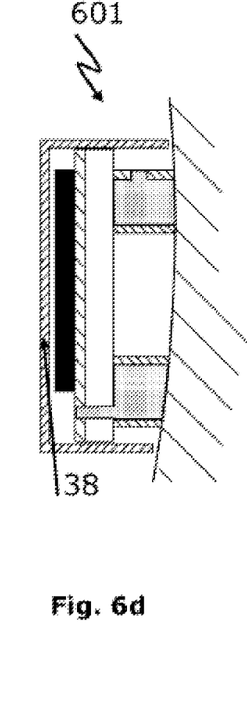

FIG. 6d shows the sensor arrangement 601 in the finished state (sensor unit 602 fastened to the structure 3). The light sources 30 were detached from the fastening element 610 after the curing process. The protective cover 38 is arranged on the fastening element 610 by means of a press fit.

Taking all the figures of the drawings together, the invention relates to a holding apparatus 10, 310, 410, 510, 610 for a sensor 12 that can be fastened to a structure 3 by means of a light-curing adhesive 24. The light-curing adhesive 24 is cured by direct and/or indirect illumination of the cavities 20 provided for receiving the light-curing adhesive 24. The invention further relates to a sensor unit 2, 302, 402, 502, 602 having a sensor 12 and a holding apparatus 10, 310, 410, 510, 610, to a sensor arrangement 1, 401, 501, 601 having a sensor unit 2 and a structure 3, and to a method for providing an arrangement 1, 401, 501, 601.

LIST OF REFERENCE SIGNS 1, 401, 501, 601 Sensor arrangement;
2, 302, 402, 502, 602 Sensor unit;
3 Structure;
10, 310, 410, 510, 610 Fastening element;
12 Sensor;
14, 514, 614 Base support element;
16 Direction of extension of the structure;
18 Sealing frame;
20, 320 Cavity;
22a Frame passage recess;
22b Support passage recess;
24 Light-curing adhesive;
26 Transparent layer;
28, 428, 628 Light-emitting surface;
30 Light source;
32 Adhesive agent;
34 Cartridge;
36 Light beams;
38 Protective cover;
40 Switchable electrical conductor/printed circuit board
42 Light-conducting element.

REFERENCE LIST

[1] Elastic Bonding—Reducing System Costs in the Solar Industry; Issue 6/2011 November-December: solar energy; Page 50, 51.
[2] Renewable Energies—Sealing/Gluing/Casting—Photovoltaic Modules; OTTO-Chemie; https://www.otto-chemie.de/de/erneuerbare-energien.
[3] European Patent Application 19180254.5.
[4] DE 10 2017 216 811 A1.

What is claimed is:
1. A fastening element for fastening a sensor to a structure to be monitored, the fastening element comprising:
a base support element;
a sealing frame for sealing the base support element with respect to the structure;

a cavity for receiving a light-curing adhesive, the cavity being delimited on one side by the base support element and peripherally by the sealing frame;

at least one light-emitting surface for coupling light beams into the cavity;

at least one light source, being a light-emitting diode, for directly or indirectly at least partially illuminating the cavity;

wherein the base support element comprises a transparent layer in which the at least one light source is arranged; and at least one passage recess for introducing the light-curing adhesive into the cavity.

2. The fastening element according to claim 1, wherein a plurality of light sources are arranged at a distance equidistance from one another.

3. The fastening element according to claim 1, wherein the at least one light sources are arranged within the cavity.

4. The fastening element according to claim 1, wherein the at least one light source is configured to emit UV light.

5. The fastening element according to claim 1, further comprising a light-conducting element for connecting the light source to the light-emitting surface in a light-conducting manner.

6. The fastening element according to claim 5, wherein the light source is arranged in the peripheral direction of the sealing frame on and/or in the sealing frame.

7. The fastening element according to claim 1, wherein the light source is detachably arranged on the base support element and/or on the sealing frame.

8. A sensor unit having the sensor and the fastening element according to claim 1, wherein the sensor is arranged on the base support element which is opposite the cavity.

9. The sensor unit according to claim 8, wherein the sensor is a strain sensor which is part of a rail monitoring element having an optical fiber comprising fiber Bragg grating.

10. A sensor arrangement having the sensor unit according to claim 8 and the structure to be monitored, wherein the sensor unit is positioned on the structure in such a way that the cavity of the sensor unit is delimited from the structure on the side opposite the base support element and wherein the cavity is at least partially filled with a UV-light-curing adhesive.

11. The sensor arrangement according to claim 10, wherein a lighting device having at least one light source is fastened on the sensor unit and wherein the lighting device is designed to directly and/or indirectly illuminate the cavity.

12. A method for fastening the sensor unit according to claim 8 to the structure, wherein the method comprises the following method steps:

a) applying the sensor unit to the structure;

b) introducing a UV-light-curing adhesive into the cavity of the sensor unit;

c) introducing light into the cavity for the purpose of curing the adhesive.

13. The fastening element according to claim 1, wherein the at least one light source is disposed inside of the transparent layer.

14. The fastening element according to claim 1, wherein the transparent layer comprises an epoxy resin lens disposed on the at least one light source.

15. The fastening element according to claim 1, wherein the at least one passage recess is disposed through the sealing frame and not through the base support element.

* * * * *